United States Patent [19]
Graef

[11] Patent Number: 6,131,151
[45] Date of Patent: Oct. 10, 2000

[54] PROCESSING HIGH-SPEED DIGITAL DATASTREAMS WITH REDUCED MEMORY

[75] Inventor: Stefan Graef, Milpitas, Calif.

[73] Assignee: LSI Logic Corporation, Milpitas, Calif.

[21] Appl. No.: 08/967,880

[22] Filed: Nov. 12, 1997

[51] Int. Cl.[7] .................................................. G06F 12/02
[52] U.S. Cl. ........................... 711/173; 711/150; 710/56
[58] Field of Search ................................... 711/170, 171, 711/173, 147, 150; 710/52, 53, 56

[56] References Cited

U.S. PATENT DOCUMENTS

| | | |
|---|---|---|
| 5,006,936 | 4/1991 | Hooks, Jr. . |
| 5,119,482 | 6/1992 | Lloyd . |
| 5,163,132 | 11/1992 | DuLac et al. . |
| 5,249,229 | 9/1993 | Poivet et al. . |
| 5,394,538 | 2/1995 | Wada et al. . |
| 5,406,554 | 4/1995 | Parry . |
| 5,412,611 | 5/1995 | Hattori et al. . |
| 5,528,522 | 6/1996 | Delguercio . |
| 5,572,691 | 11/1996 | Koudmani . |
| 5,592,497 | 1/1997 | Lokhoff ................................. 714/755 |
| 5,903,282 | 5/1999 | Schoner et al. ........................ 345/507 |
| 5,909,224 | 6/1999 | Fung ..................................... 345/508 |

OTHER PUBLICATIONS

L64002 MPEG–2 Audio/Video Decoder, "Video Compression and Decompression Concepts," chapter 1, pp. 1-1-1-26.

*Primary Examiner*—Eddie P. Chan
*Assistant Examiner*—Kevin L. Ellis

[57] ABSTRACT

Methods and apparatus are described for managing high-bandwidth incoming digital data streams, such as MPEG encoded data streams, while reducing memory requirements. Frames of incoming data are divided into smaller slices, for example four slices per frame. A sequencing memory is used to store frame store memory addresses pointing to locations in the frame store buffer where slices of data are stored. As incoming data is stored in the frame buffer, corresponding start location addresses are stored in the sequencing memory, and corresponding bits in a status register are marked as busy. Conversely, as data is read out of the frame store for decoding or reconstruction, the corresponding bit in the status register is changed to the free status, as each slice of data is processed. This procedure and corresponding architecture reduces frame store memory requirements.

17 Claims, 6 Drawing Sheets

```
select1-proc:PROCESS(...)
IFreg[0]='0' then
    part-1<='0';
ELSEIFreg[1]='0' then
    part-1<='1';
ELSEIFpart-1<=not-found;
ENDIF;
ENDPROCESS;

select2-proc:PROCESS(...)
IFreg[2]='0' then
    part-2<='0';
ELSEIFreg[3]='0' then
    part-2<='1';
ELSEpart-2<=not-found;
ENDIF;
ENDPROCESS;

assign-proc:PROCESS(...)
IFpart-1/=not-foundTHEN
    free-reg<=part-1;
ELSEIFpart-2/=not-found;
    free-reg<=part-2;
ELSEfree-reg<='X';
ENDIF;
ENDPROCESS;
```

PROCESSING HIGH-SPEED DIGITAL DATASTREAMS WITH REDUCED MEMORY

The present invention lies in the field of processing high-speed digital datastreams and, more specifically, provides for receiving and processing substantially continuous datastreams with reduced memory.

BACKGROUND OF THE INVENTION

In many applications, digital datastreams are used to move high volumes of data at high speeds. A common example is MPEG data, which contains audio and video information, encoded into a digital serial datastream according to an MPEG standard—MPEG-2 being most popular at the moment. MPEG encoding is used to transmit a video clip over a network or the internet, to cite just one example. At the receiving end, the datastream must be decoded or "reconstructed" to reproduce and output the original audio and video information. This job is complicated by the volume of data, and the fact that the datastream must be reconstructed in "real time", i.e. essentially at the same rate it is being received. One approach to the problem is to provide adequate memory to buffer incoming data in the worst case.

Buffering incoming digital data for further processing appears in other contexts as well. For example, U.S. Pat. No. 5,163,132 to DuLac et al., is directed to interfacing a disk drive to a small computer system interface (SCSI) bus by use of two buffers connected between a buffer-in bus and a buffer-out bus. That architecture allows data to be read out from a first filled buffer, while simultaneously filling the second buffer. When the second buffer is full and the first buffer is empty, the second buffer may be read while the first buffer is again filled. This "toggling" between the two buffers continues until the required data transfer is complete. In the disk drive context, both the system bus data rates and the disk drive controller data rates are well known. Accordingly, the buffering scheme can be entirely synchronized and the amount of memory required is well defined. In buffering an incoming MPEG datastream, however, the time necessary for reconstructing the video information varies, and, accordingly, the buffering requirements vary from one application to another and, indeed, from one frame of video data to another even during a single transmission. Accordingly, the architecture taught by DuLac et al., is not very helpful in MPEG processing.

U.S. Pat. No. 5,119,482 to Lloyd describes a navigation system data interface box to allow transfer of INS data to a PC for flexible in-flight use of data received from the INS. Here, two pages of memory buffer are "flipped" or toggled, somewhat like the system described in DuLac et al. Lloyd further describes means for inhibiting the page flips when the data converter is busy. The PC then requests a cycle of data by sending a control bit to the converter circuit, much like a ready bit. However, in handling an incoming MPEG datastream, the receiving apparatus does not have the luxury of asserting a wait state or "not ready" flag. The MPEG datastream must be properly received, buffered and reconstructed at the incoming data rate or data will be lost. Accordingly, the buffering system must be able to adapt to variations in delay for reconstructing the data. For this reason, the architecture described in the Lloyd patent would be inadequate for processing an MPEG or other continuous type of datastream.

U.S. Pat. No. 5,528,522 to Delguercio describes a portable radar or beacon emulator. In the emulator, a computer calculates data for one antennae scan and stores it in a memory bank. As that data is being read out as radar video which is displayed on a screen, the computer calculates the data for the next scan and stores it in a next data bank. In this way, a continuous series of scans is presented without requiring the extensive computational power that would be required to display a radar scan as it is being calculated. Thus, this patent discloses another application of switching or toggling a pair of memory banks; allowing output from one memory bank while data is written into or generated in the other memory bank. As mentioned above, however, receiving an MPEG data stream presents additional challenges. Because of variations in the time necessary for reconstructing the video, the memory buffer requirements vary dynamically. While this problem could be addressed by providing large quantities of memory, that approach is neither efficient nor cost-effective. The need thus remains for improved methods and apparatus for receiving and reconstructing high bandwidth digital datastreams, such as MPEG datastreams, while minimizing the usage of memory space.

SUMMARY OF THE INVENTION

In the prior art architectures summarized above, two banks of memory are toggled so the data can be written into one bank of memory while it is read out of the other. In the context of an MPEG datastream, variations in the data rate and reconstruction times could be accommodated simply by providing sufficient amounts of memory to accommodate the worst case scenarios. However, this approach is wasteful and inefficient. The present invention reduces memory requirements by managing a smaller amount of memory so that it is used more efficiently. This has the advantage of reducing costs without compromising performance. More specifically, in the prior art, it was necessary to provide two blocks of memory, each large enough to accommodate a full frame of video data. According to the present invention, a single memory space is used, and portions of it are rewritten as soon as the corresponding portion of the frame has been read out of the memory. Thus, the memory is reused without waiting for a full frame buffer to empty.

According to another aspect of the invention, advantage is taken of the fact that data is read out for reconstruction in a "slice-by-slice" manner. Each slice of data, once read out, is no longer needed. The present invention takes advantage of that available slice of memory without waiting for the full frame to empty, thereby reducing memory overhead. In one illustrative embodiment, the new method requires an amount of memory corresponding to one frame of data, plus two slices of data, as compared to the two full frames of memory required in the prior art.

Another aspect of the invention addresses variations in reconstruction time. Because some slices of data will be reconstructed faster than others, slices of memory become available at locations that cannot be predicted. One feature of the present invention is that it quickly locates available slices of memory and uses them for receiving incoming data.

A further aspect of the present invention is directed to a novel system for managing a frame store memory for receiving and processing a substantially continuous incoming digital datastream. In one example such a system includes a sequencing memory for storing addresses for accessing the frame store memory. A write address counter accesses the sequencing memory to write frame store addresses into the sequencing memory as data, each frame store address indicating a start address for storing an incoming slice of data from the datastream payload into the frame store memory. At the same time, the frame store address is provided to the frame store itself for storing the incoming data. A read address counter accesses the sequencing memory to read stored frame store addresses from the sequencing memory, each stored frame store address indicating a start address for processing a selected slice of data stored the frame store memory. By "processing" we mean any manipulation of the data, such as reconstruction of video content for display.

The described system further includes a status memory for maintaining a corresponding indication as "free" or "busy" for each one of a plurality of segments of memory space in the frame store memory, each such segment of memory space starting at a corresponding starting address and sized for storing at least one slice of data from the incoming datastream. Circuitry or software is provided for clearing the corresponding indication in the status memory to the free state after processing the selected slice of data stored in the frame store memory is completed, thereby making the corresponding segment of memory space available for storing a second incoming slice of data from the datastream into the frame store memory. Additional circuitry or software is provided for searching the status memory to identify a free segment of memory space and for storing the corresponding frame store address in the sequencing memory to provide a start address for storing the second incoming slice of data from the datastream into the frame store memory.

Additionally, a frame size register can be implemented for storing a frame size characteristic of the incoming datastream; and a lookup table can be used for storing a series of frame store addresses, each frame store address corresponding to one slice of data based on the frame size characteristic of the incoming datastream, ad further described later. In one embodiment, the described system for managing a frame store memory is reconfigurable in response to the frame size, and the sequencing memory is configured to provide a number of entries corresponding to a selected number of slices per frame plus at least one extra slice; and the read address counter and the write address counter are configured in accordance with the number of entries in the sequencing memory.

The foregoing and other objects, features and advantages of the invention will become more readily apparent from the following detailed description of a preferred embodiment which proceeds with reference to the drawings.

DETAILED DESCRIPTION OF A PREFERRED EMBODIMENT

Figure 1:
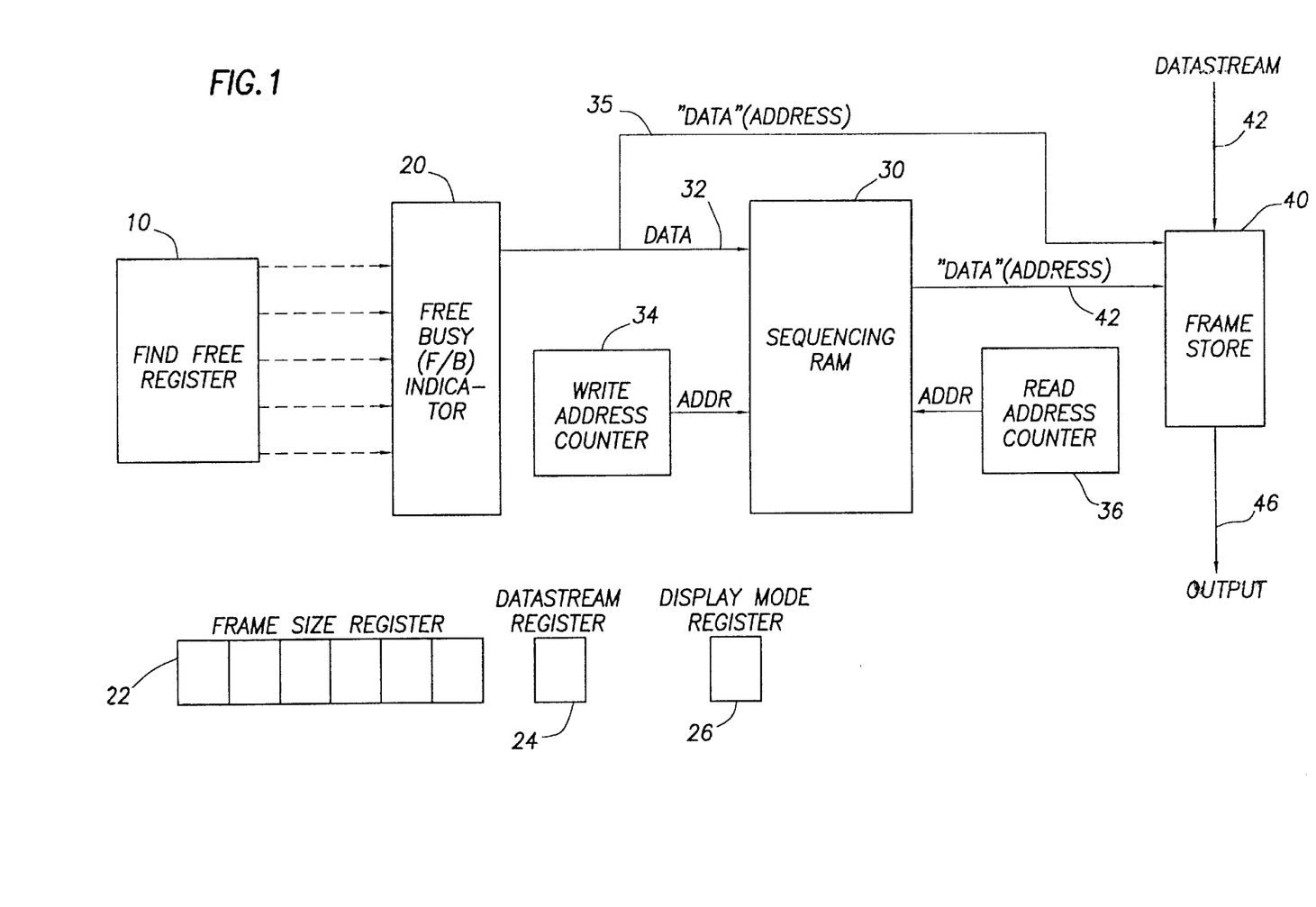
FIG. 1 is a high-level block diagram of an MPEG data stream buffer apparatus according to the present invention.

FIG. 1 is a simplified block diagram of one implementation of the invention for processing an MPEG datastream. An MPEG datastream delivers one frame after the other; mixing together two frames does not occur pursuant to the MPEG standard.

Figure 2:
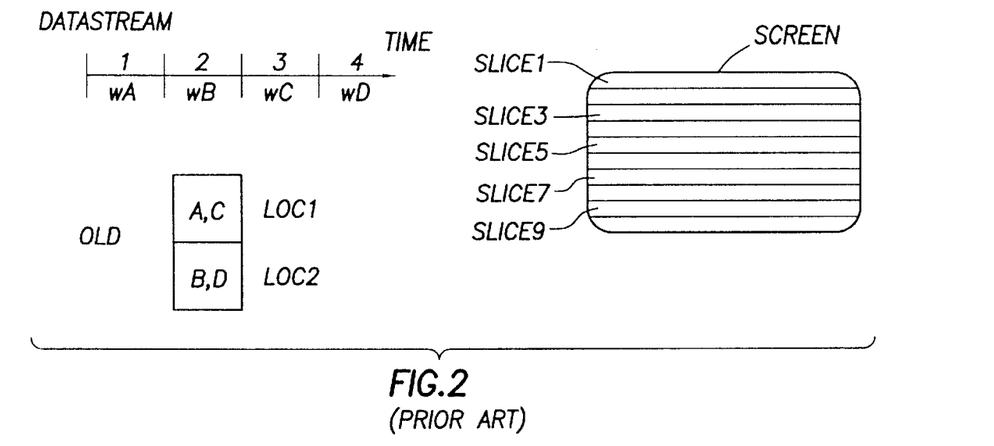
FIG. 2 is a simplified diagram illustrating prior art methodology for buffering an incoming MPEG data stream.

A simplified illustration of operation of an MPEG system according to the prior art is shown in FIG. 2. As indicated in the time line in FIG. 2, an incoming MPEG data stream comprises a series of frames of data A, B, C and D. This data must be written into memory continuously. A write operation is indicated by "w" in the drawing. Two frames of memory are provided, location 1 and location 2, as described in the background section. Frame A is written into location 1, and then frame B is written into location 2. While frame B data is written into location 2, the frame A data in location 1 is processed, for example by reconstruction hardware or software. After the frame B data is written in location 2 (and assuming reconstruction of frame A data has been completed), frame C data is written to location 1, overwriting the previous contents. While frame C data is written into location 1, the frame B data is processed in location 2. Finally, frame D data is overwritten in location 2, while the frame C data is processed, and so on.

Figure 3:
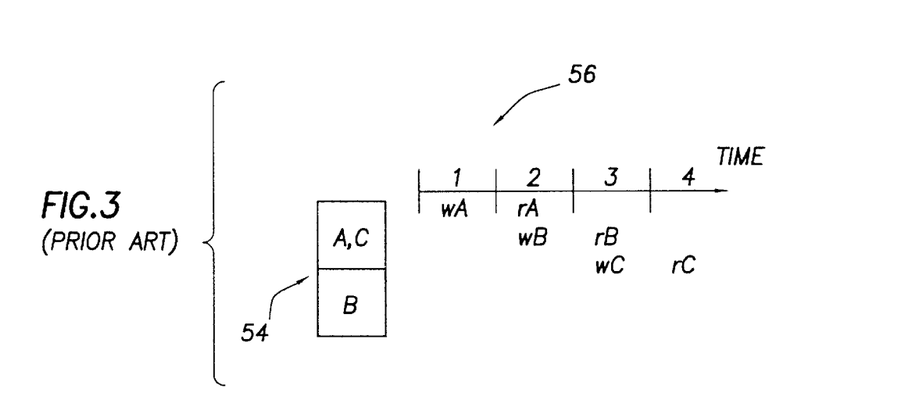
FIG. 3 is a simplified diagram illustrating decoding of MPEG data stored in a buffer as illustrated in FIG. 2.

FIG. 3 illustrates this dynamic process. It shows in the timeline writing (w) frame A data in time slot 1, and then simultaneously reading (r) frame A data and writing (w) frame B data in time slot 2. Time slot 3 shows reading the B frame data while writing the frame C data, and so on. Thus, it can be seen that the prior art methodology for receiving the continuous data stream and simultaneously decoding the data requires the ability to store at least two full frames of an MPEG data stream.

Figure 4A:
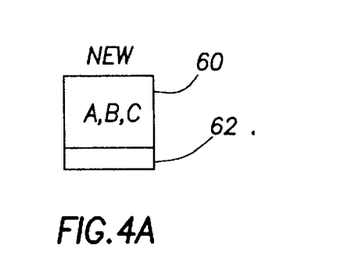
FIGS. 4a and 4b is a simplified block diagram illustrating buffering of an incoming data stream into a reduced-size memory according to an aspect of the present invention.

FIG. 4A is a simplified illustration of a methodology according to the present invention. In FIG. 4A, memory space includes two regions 60 and 62. Region 60 is sized to accommodate one full frame of MPEG data and the region 62 provides space for storing an additional two slices of data as further described shortly.

Figure 4B:
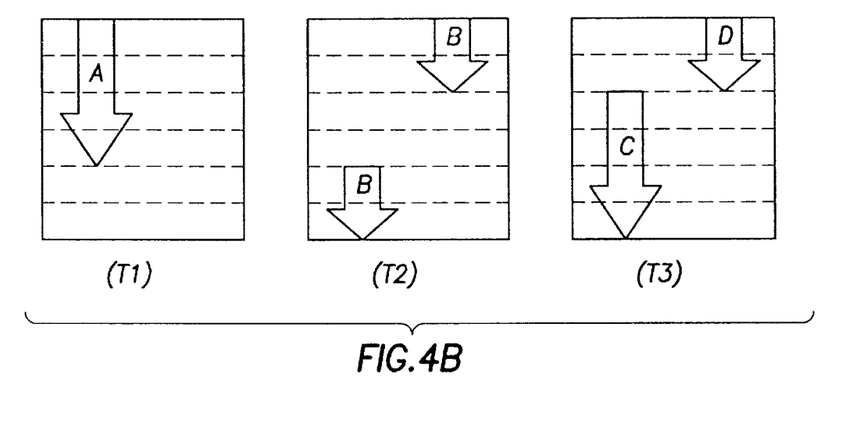

FIG. 4B is a series of memory maps illustrating how data can be stored in the memory space according to the present invention, although this is merely one arbitrary example and the specific sequence, and selection of segments of the memory will vary dynamically as more fully explained bleow. In FIG. 4B, at time T1, frame A data has been stored in the first four segments of the memory space. At a later time T2, the first two slices of frame B data have been stored in the last two segments, and the last two slices of frame B stored where frame A data resided previously. In the interim between T1 and T2, in other words, at least the first two slices of A data were processed. Next, at time T3, we see frame C data stored in segments 3 through 6 of the memory (one slice was stored at a time); and finally, the first two slices of frame D data is stored in memory segments 1 and 2, as more fully explained below.

The new methodology for processing the data stream in a reduced memory space can be accomplished using various hardware implementations, an illustrative block diagram of which is shown in FIG. 1. In FIG. 1, the "find free register element" 10 represents hardware or software, described in more detail later, for quickly locating one or more "free" bits in a register 20. Register 20 is a "free/busy" indicator having a plurality of bit positions, each of which corresponds to a segment of memory space in the frame store. Size of the memory segment is reconfigurable rather than fixed. Moreover, each bit in the free/busy indicator does not have a fixed, one-to-one correspondence to a segment of memory in the frame store. Rather, the corresponding memory segment changes dynamically as will be described. The free/busy ("F/B") register 20, sequencing RAM 30 and segment size in the frame store are all configured or scaled based on the frame size.

The size of a frame being transported in an MPEG datastream is always present within the stream. This frame size information is read and stored in a frame size register 22. This allows the apparatus to scale itself to the size of frame required, as further described below. Also, an indication as to whether an interlaced or progressive encoding is used in the payload of the datastream is included as part of the header information as part of the datastream. This information is stored in the interlaced/progressive datastream register 24, which can be a single bit. Finally, an indication as to whether the output system, such as a display, operates an interlaced or progressive mode is indicated in the interlace/progressive display mode register 26. This information is dictated by the output system rather than the incoming datastream. Although registers 22, 24 and 26 are illustrated as separate registers, they could be implemented in various ways such as within a single register or predetermined memory locations. Implementation details are omitted so as to avoid obscuring the description of the invention.

The frame is logically divided into slices. The number of slices depends on the size of the frame. For purposes of illustration, we take an example in which the number of slices per frame is four. Two additional slices of memory are required, so the total number of slices in the illustration is six. Accordingly, in this example, the free/busy indicator register 20 has six bit positions, numbered 1 through 5 in the figures described below. Thus, each bit in the register represents one slice and will reflect whether the corresponding slice of memory is currently occupied or free for usage. For illustration, we will use a binary 1 to indicate occupied, and 0 indicates free.

Each of these registers is associated with a fixed memory address. This address will be written into the sequencing RAM 30 via address path 32. In other words, the "data" stored in the sequencing RAM 30 is address information to be used for accessing the frame store memory 40. The actual payload data of the data stream is input to the frame store 40 via input path 42. Thus, in effect, the sequencing RAM 30 keeps track of which slice of data is written into which frame store segment.

The actual address associated with a free/busy (hereafter "F/B") register element depends on the size of a slice. For illustration, we use an example in which one slice comprises 00AF bytes. After one full frame is written into the frame store 40, decoding of that frame can begin. In order to determine the location in the frame store 40 where the frame begins, and the sequence of data being written into the frame store, a read counter 36 addresses the sequencing RAM 30 to read out the beginning addresses for each slice, and those addresses are provided as "data" output from the sequencing RAM 30 to address inputs to the frame store 40 via path 42.

Figure 5:
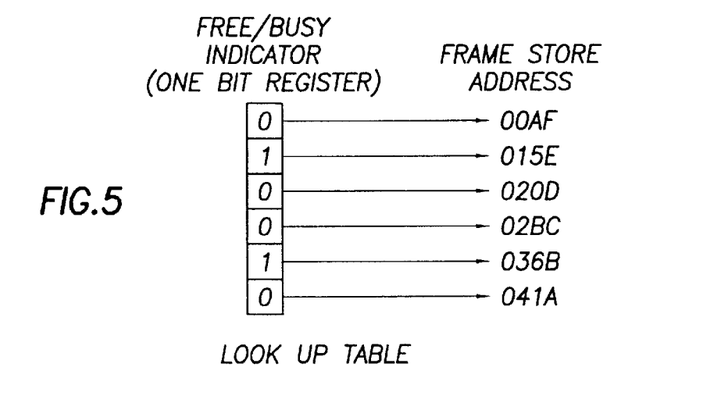
FIG. 5 illustrates use of the free/busy register look-up table to access corresponding frame store addresses.

Operation according to the methodology of the present invention is further described by way of an example. Referring to FIG. 5, a look-up table is illustrated that provides for look up of a corresponding frame store address for each bit of the F/B register. In this example, as noted, each slice of data is assumed to consist of 00AF bytes. The look-up table can be constructed by accessing the frame-size register 22 to determine the frame size, and dividing it by the number of slices per frame to obtain the number of bytes per slice. For each slice, the frame store address is implemented by the figure, here 00AF(hex). In an alternative arrangement, hardware could be provided for calculating these addresses on the fly, rather than using a look-up table, although this would increase gate count in an integrated circuit embodiment. These and other implementation details are left to the discretion of a designer without departing from the scope of the invention.

Figure 6A:
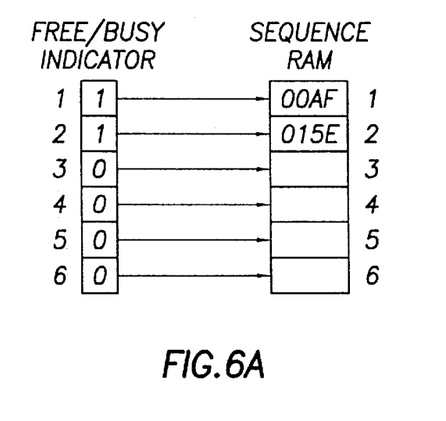
FIGS. 6A–6H sequentially illustrate operation of the present invention for receiving an incoming MPEG data stream, reconstructing video data, and writing the reconstructed data to a frame buffer memory.

Referring now to FIG. 6A, operation is described beginning at an arbitrary point in time in which two slices of data are already stored in the frame store. This example assumes that the data is progressive, i.e., that it is received sequentially. To simplify the description, we use the following naming convention:

TABLE 1

Naming Convention Table.

| SL1(A) | ==> | Slice one of Frame A |
| SL2(A) | ==> | Slice two of Frame A |
| SL3(A) | ==> | Slice three of Frame A |
| SlA(A) | ==> | Slice four of Frame A |
| SL1(B) | ==> | Slice one of Frame B |
| SL2(B) | ==> | Slice two of Frame B |
| SL3(B) | ==> | Slice three of Frame B |
| SL4(B) | ==> | Slice four of Frame B |

Figure 6B:
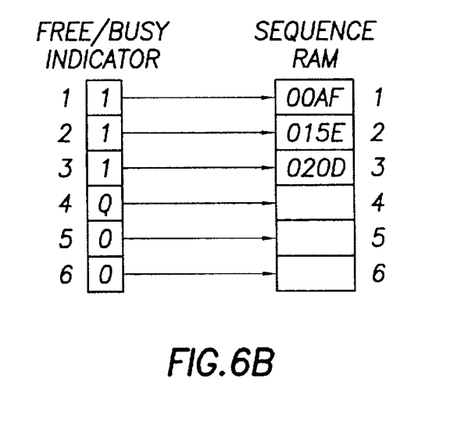

In FIG. 6A, the first two slices of data, SL1(A), SL2(A) are already fully written into the frame store. Consequently, the register bits 1 and 2 of the F/B register field are marked "busy" as indicated by 1's. When receiving additional data from the datastream, circuitry 10 (described later) searches through the F/B register to find a free element, in this case element 3 i.e. bit 3 of F/B register 20. As indicated in FIG. 6B, this bit is marked "1" to indicate that it is currently occupied or busy, and the corresponding frame store address associated with bit 3, namely 020D as shown in the look-up table, is written into the third location of the sequencing RAM (30 in FIG. 1) as illustrated in FIG. 6B. When the third slice SL3(A) is fully written into the frame store, the circuit will again search the F/B register to find another register marked "free." Then the address associated with this register (register bit 4), as indicated in the look-up table as address 02BC, is written into the sequencing RAM at location 4 to provide the start address for storage of this slice of the payload of the datastream into the frame store. Slice SL4(A) is written into the frame store at that location. One full frame has now been stored.

Upon completion of writing one full frame of data into the frame store memory, the process becomes more complicated, as now the reconstruction process needs to operate on data stored in the frame store and therefore must be able to locate and access data in the frame store. At the same time, receipt of incoming new data continues.

The stored data is provided for decoding or reconstruction as follows. A read address counter 36 addresses the sequencing RAM 30 as shown in FIG. 1. This counter goes through the sequencing RAM and reads out the addresses where the write process wrote the data into the frame store 40. In the case where progressive encoding is employed in the datastream, as indicated in register 24, and progressive encoding is desired for the subsequent processing, the read address counter 36 addresses the sequencing RAM 30 to read the addresses stored in the sequencing RAM in a top down fashion, viz: SL1(A)—00AF, SL2(A)—015E, SL3 (A)—020D etc. This process also resets the corresponding bit to 0 (free) in the F/B register 20. In this way, after each slice of data is read out to the reconstruction process, the corresponding bit in the F/B register indicates that the corresponding segment of memory is now available to receive new incoming data.

Overhead of at least two slices of memory is needed as the read process can only set free a slice after it has fully read out that slice of data. During this time, the write process still needs a location in which to write the incoming datastream. Therefore, an extra slice of memory is required. Additionally, one cannot always be assured that this read process will require a fixed time, and in some cases the time to read out a slice of data may exceed the time for receiving a slice of data. The second extra slice of memory is provided for this reason.

Figure 6C:
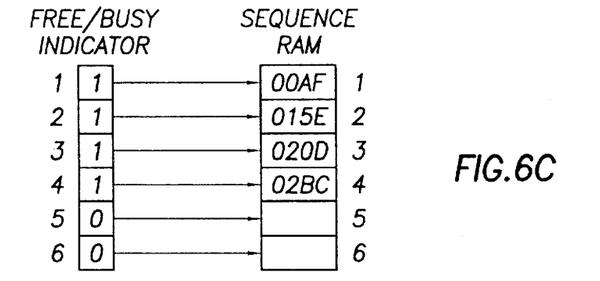

As noted, incoming data continues to be received during the reconstruction process. As soon as one slice of data is set free, as described, the write process can assign this slice for writing new data into the corresponding region of memory. To illustrate, in FIG. 6C, a full frame of data (four slices) have been stored in the frame buffer. The F/B indicator shows that bits 5 and 6 are available to receive new data.

Figure 6D:
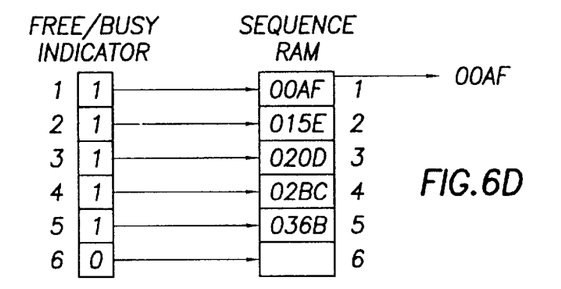

Referring to FIG. 6D, bit 5 is now shown as busy, and the next address 036B is stored in the next location (location 5) of the sequence RAM and provided to the frame store via bus 35. That address is used to store the next slice of data SL1(B). At the same time, the read address counter 36 accesses location 1 of the sequence RAM to read out the address 00AF that allows the reconstruction process to access SL1(A) to begin reconstruction of the first frame of data. At the same time, new data is being written into the frame store beginning at address 036B, as indicated in location 5 of the sequence RAM.

Figure 6E:
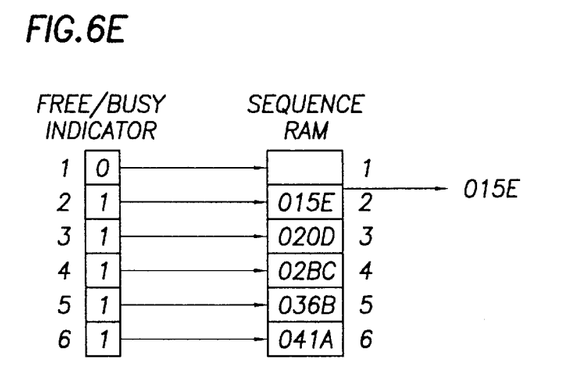

After the reconstruction process has completed reading the first slice of frame A, the corresponding F/B bit is cleared as shown in FIG. 6E. The F/B register is searched and a free location (here location 6) is marked "busy" and the next address 041A is stored in the sequence RAM location 6, as a start location for storing the next slice, SL2(B) in the frame store. At the same time, read address 015E is read out of the sequence RAM as data, and provided to the frame store as a start address for reading the corresponding slice of data for reconstruction.

Figure 6F:
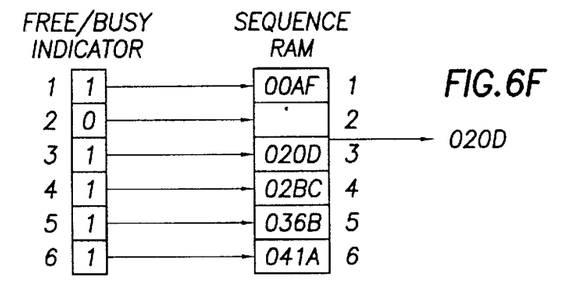

Referring next to FIG. 6F, bit 2 of the F/B register is now freed up, the next slice SL3(A) is being read from the frame store at address 020D and so on as described. This sequence of events is summarized over multiple frames of data in the following table.

TABLE 2

Sequence of Slices Being Used For Read and Write

| frame sequence for write | Write start address | Read Start Address | frame sequence for read |
|---|---|---|---|
| FRAME 1 | 00AF | | |
| | 015E | | |
| | 920D | | |
| | 02BC | | |
| FRAME 1 | 036B | 00AF | FRAME 2 |
| | 041A | 015E | |

TABLE 2-continued

Sequence of Slices Being Used For Read and Write

| frame sequence for write | Write start address | Read Start Address | frame sequence for read |
|---|---|---|---|
| | 00A1 | 020D | |
| | 020D | 02BC | |
| FRAME 2 | 02BC | 036B | FRAME 3 |
| | 036B | 041A | |
| | 041A | 00AF | |
| | 015E | 020D | |
| FRAME 3 | 00AF | 02BC | FRAME 4 |
| | 020D | 036B | |
| | 02BC | 041A | |
| | 036B | 015E | |

Figure 6G:
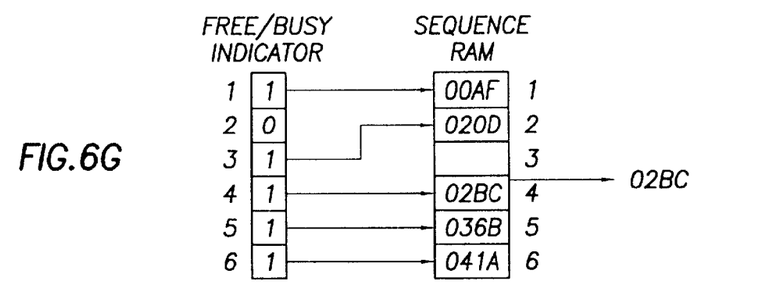
Figure 6H:
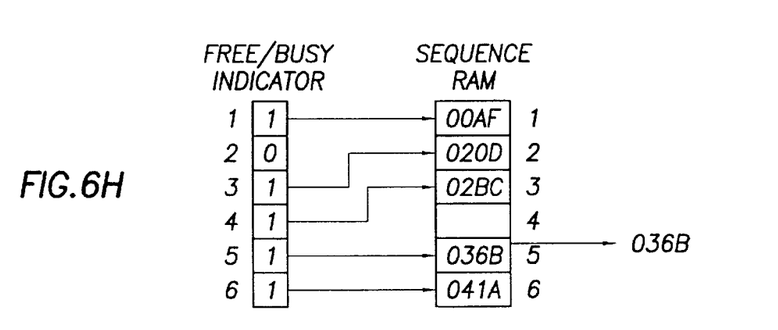

Referring now to FIG. 6G, both the F/B bits 2 and 3 are shown as free (value 0). The free bits search apparatus (or software) does not necessarily identify the next available free bit in top down sequence. Here, for purposes of illustration, bit 3 is selected. Consequently, the address corresponding to bit 3 (from the look-up table of FIG. 5), namely 020D, is written into the next location of the sequence RAM, location 2. The next slice of incoming data SL4(B), will be stored at location 020D in the frame store. The search mechanism searches the F/B register in order to find the first available free bit, corresponding to the first available segment of memory, as quickly as possible. Since the reconstruction time can vary from one segment of data to another, the F/B bits will not necessarily be freed up sequentially. The present invention helps to optimize this process by seizing the next available segment of memory to write incoming data, where ever that segment might be located. Since the corresponding address is stored in the sequence RAM, it will be used at the appropriate time when the reconstruction process is ready to access the corresponding slice of data. In this way, the frame store memory is used most efficiently, even though slices of data may be stored "out of order."

Figure 7:
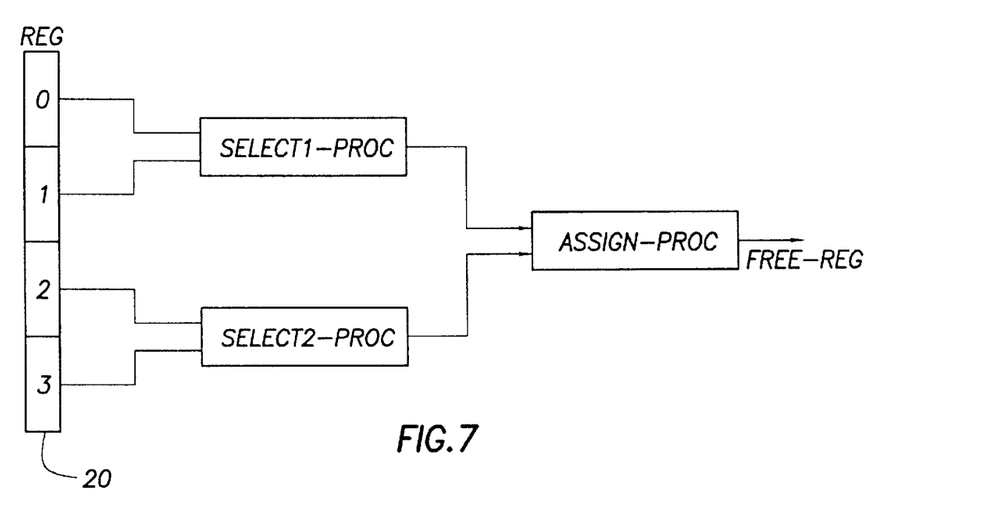
FIG. 7 is a simplified block diagram illustrating a methodology for locating an available section of memory in which to write incoming data.
Figure 8:
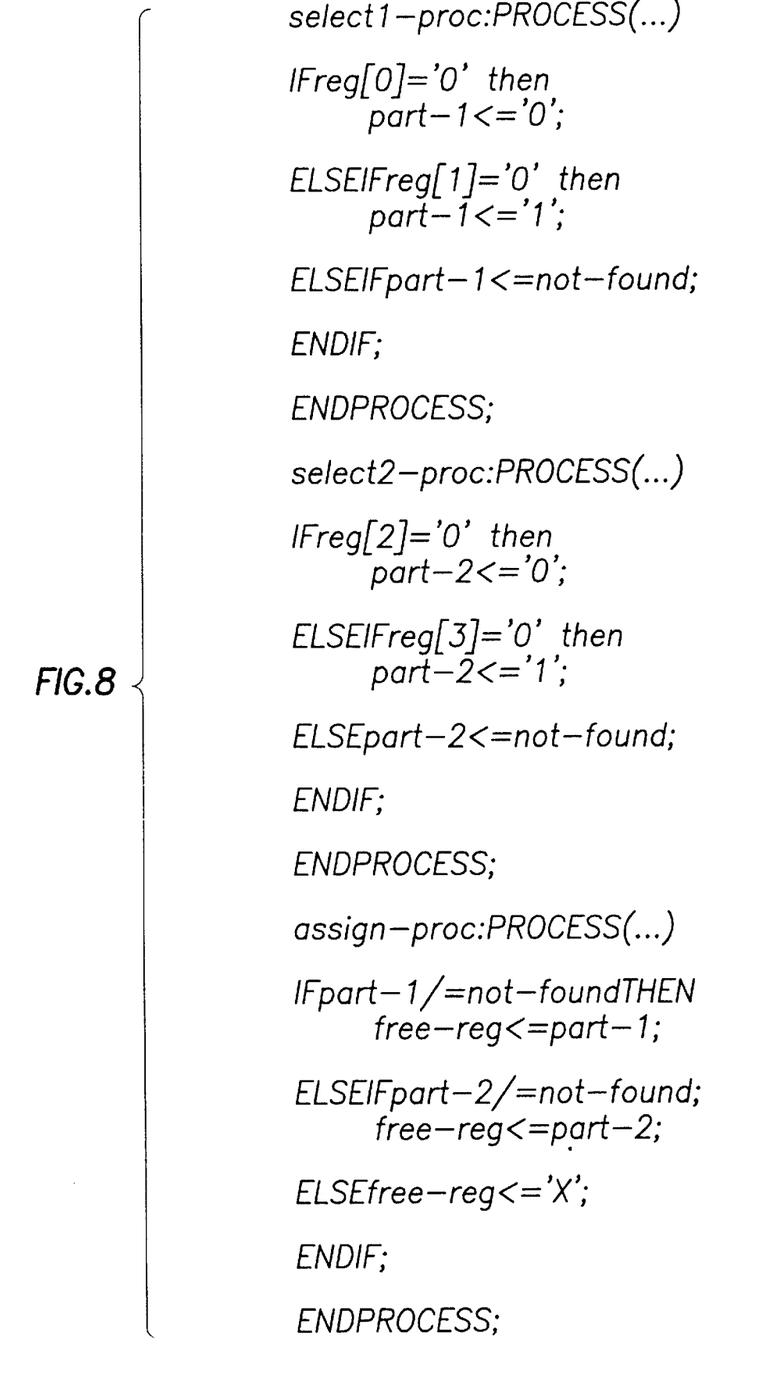
FIG. 8 is an example of an HDL code program for conveniently implementing a search strategy of the type illustrated in FIG. 7.

FIG. 7 a binary search circuit coupled to free/busy status register 20. HDL code for implementing modules SELECT1-PROC, SELECT2-PROC, and ASSIGN-PROC in hardware is shown in FIG. 8. These modules may alternatively be implemented in software.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A system for managing a frame store memory for receiving and processing a substantially continuous incoming digital datastream, the system comprising:

a sequencing memory for storing addresses for accessing the frame store memory;

a write address counter for accessing the sequencing memory to write frame store addresses into the sequencing memory, each frame store address indicating a start address for storing an incoming slice of data from the datastream into the frame store memory;

a read address counter for accessing the sequencing memory to read stored frame store addresses from the sequencing memory and to provide the frame store addresses to the frame store memory, each stored frame store address indicating a start address for processing a selected slice of data stored in the frame store memory;

a status memory for maintaining a corresponding indication as free or busy for each one of a plurality of segments of memory space in the frame store memory, each segment of memory space starting at a corresponding starting address and sized for storing at least one slice of data from the incoming datastream;

a first circuit for clearing the corresponding indication in the status memory to the free state after processing of the selected slice of data stored in the frame store memory is completed, thereby making the corresponding segment of memory space available for storing a new incoming slice of data from the datastream into the frame store memory;

a second circuit for searching the status memory to identify a free segment of memory space and storing the corresponding frame store address in the sequencing memory to provide a start address for storing the new incoming slice of data from the datastream into the frame store memory;

a frame size register for storing a frame size characteristic of the incoming datastream; and a lookup table for storing a series of frame store addresses, each frame store address corresponding to a segment of memory space sized for one slice of data based on the frame size characteristic of the incoming datastream, wherein the second circuit accesses the lookup table to provide frame store addresses to the sequencing memory.

2. A system for managing a frame store memory according to claim 1 wherein the system is reconfigurable in response to the frame size characteristic, wherein the sequencing memory is configured to provide a number of entries corresponding to a selected number of slices per frame plus at least one extra slice, and wherein the read address counter and the write address counter are configured in accordance with the number of entries in the sequencing memory.

3. A system for managing a frame store memory according to claim 1 and further comprising:

a display mode register for storing an indication of a display mode as being interlaced or progressive, wherein the read address counter is configurable for accessing the sequencing memory to read stored frame store addresses in an interlaced sequence in accordance with the display mode indicated in the display mode register.

4. A system for managing a frame store memory according to claim 1 wherein the sequencing memory is implemented in RAM.

5. A system for managing a frame store memory according to claim 1 and further comprising:

a datastream format register for storing an indication as to whether the incoming datastream employs an interlaced format or a progressive format, wherein the read address counter is configurable for accessing the sequencing memory to read stored frame store addresses in a sequence according to the format indicated in the datastream format register.

6. A system for managing a frame store memory according to claim 1 wherein the status memory comprises a register having one respective bit corresponding to each of the said segments of frame store memory space.

7. A system for managing a frame store memory according to claim 1 wherein the status memory comprises a plurality of one-bit registers, each one-bit register indicating the free/busy status of a corresponding one of the segments of frame store memory space.

8. A system for managing a frame store memory for receiving and processing a substantially continuous incoming digital datastream, the system comprising:

sequencing memory means for storing addresses for accessing the frame store memory;

write means for accessing the sequencing memory means to write frame store addresses into the sequencing memory means, each frame store address indicating a start address for storing a first incoming slice of data from the datastream into the frame store memory;

read means for accessing the sequencing memory means to read stored frame store addresses, each stored frame store address indicating a start address for processing a selected slice of data stored in the frame store memory;

status means for maintaining a corresponding indication as free or busy for each one of a plurality of segments of memory space in the frame store memory, each segment of memory space starting at a corresponding starting address and sized for storing at least one slice of data from the incoming datastream;

means for changing the corresponding indication in the status means to indicate the free state after processing of the selected slice of data stored in the frame store memory is completed, thereby making the corresponding segment of memory space available for storing a second incoming slice of data from the datastream into the frame store memory;

means for searching the status means to identify a free segment of memory space and storing the corresponding frame store address in the sequencing memory means to provide a start address for storing the second incoming slice of data from the datastream into the frame store memory; and means for generating a series of frame store addresses corresponding to segments of memory space sized for slices of data in response to the incoming datastream frame size.

9. A system for managing a frame store memory according to claim 8 wherein the sequencing memory means comprises a portion of a random access memory.

10. A system for managing a frame store memory according to claim 8 wherein the means for generating the series of frame store addresses includes memory means for storing the frame store addresses in a lookup table in response to header information in the incoming datastream.

11. A system for managing a frame store memory according to claim 8 wherein the means for searching the status means includes a binary tree circuit.

12. A system for managing a frame store memory according to claim 8 wherein the means for searching the status means includes a binary tree search process.

13. An MPEG decoder comprising:

a frame store memory for receiving and processing an incoming MPEG datastream payload;

a sequencing memory for storing addresses for accessing the frame store memory, the sequencing memory including:

a write port for storing frame store addresses as data in the sequencing memory, the frame store addresses corresponding to starting addresses for storing slices of the incoming datastream into the frame store memory; and a read port for reading stored frame store addresses for accessing slices of data stored in the frame store memory for processing the slices of data in a selected sequence responsive to a sequence in which the slices of data were stored in the frame store memory;

a status memory for maintaining a corresponding indication as free or busy for each one of a plurality of segments of memory space in the frame store memory, each segment of memory space starting at a corresponding starting address and sized for storing at least one of said slices of data from the incoming datastream;

means for searching the status memory to identify a free segment of memory space and storing the corresponding frame store address in the sequencing memory to provide a start address for storing an incoming slice of data from the datastream into the frame store memory; and a lookup table for storing a series of frame store addresses, each frame store address corresponding to a segment of memory space sized for one slice of data based on a frame size characteristic of the incoming datastream, wherein the means for searching accesses the lookup table to provide frame store addresses to the sequencing memory.

14. An MPEG receiver according to claim 13 wherein the sequencing memory includes a memory location for each one of a number of data slices equal to a selected number of slices per frame plus a number of extra slices equal to at least two extra slices.

15. An MPEG receiver according to claim 14 wherein the number of slices per frame is at least four.

16. A method of managing a frame store memory for receiving and processing a substantially continuous incoming digital datastream, the method comprising the steps of:

determining from the incoming datastream a frame size;

establishing a series of frame store addresses for storing slices of the incoming data, each slice being smaller than a frame of data, wherein establishing the series of frame store addresses includes sizing each segment of frame store memory as a predetermined fraction of the frame size;

for each one of the series of frame store addresses, maintaining a status of a corresponding segment of the frame store memory as either free or busy;

finding a free segment of memory in the frame store;

changing the status of the free segment to busy, storing a slice of the incoming datastream into the frame store starting at the start address corresponding to the free segment, and storing the start address as data in a sequencing memory;

reading a start address from the sequencing memory to access a slice of data previously stored in the frame store for processing;

processing the accessed slice of data;

after each slice of data is processed out of the frame store, changing the status of the corresponding segment of memory to indicate free status;

repeating said finding, changing to busy and storing steps as long as the incoming datastream continues; and concurrently with said finding, changing to busy and storing steps, repeating said reading, processing and changing to free status steps until all of the stored slices of data have been processed, whereby segments of frame store memory are made available to store new incoming data after each slice has been processed.

17. A method of managing a frame store memory according to claim 16 wherein said maintaining the status of the segments of frame store memory includes providing a free/busy register having a status bit for each of the frame store addresses in the series of frame store addresses, wherein changing the status of a segment of memory comprises changing the logic state of the corresponding bit in the free/busy register, and wherein said finding step includes searching the free/busy register to locate a bit in the free state.

* * * * *